(12) United States Patent
Schultz

(10) Patent No.: US 10,663,074 B2
(45) Date of Patent: May 26, 2020

(54) ENVIRONMENTALLY RESPONSIVE FLUID DIVERSION DEVICE AND SYSTEM WITH OVERRIDE CAPABILITY

(71) Applicant: John Schultz, Bonny Doon, CA (US)

(72) Inventor: John Schultz, Bonny Doon, CA (US)

( * ) Notice: Subject to any disclaimer, the term of this patent is extended or adjusted under 35 U.S.C. 154(b) by 188 days.

(21) Appl. No.: 16/032,053

(22) Filed: Jul. 10, 2018

(65) Prior Publication Data

US 2020/0018405 A1 Jan. 16, 2020

(51) Int. Cl.
| | | |
|---|---|---|
| *F16K 31/70* | (2006.01) | |
| *F16K 31/00* | (2006.01) | |
| *G05D 23/02* | (2006.01) | |
| *F16K 11/065* | (2006.01) | |
| *E03B 7/04* | (2006.01) | |

(52) U.S. Cl.
CPC .......... *F16K 31/002* (2013.01); *G05D 23/02* (2013.01); *E03B 7/045* (2013.01); *F16K 11/0655* (2013.01)

(58) Field of Classification Search
CPC ....... E03B 7/045; F16K 31/002; G05D 23/00; G05D 23/02; G05D 23/021; G05D 23/022; G05D 23/024; G05D 23/025
See application file for complete search history.

(56) References Cited

U.S. PATENT DOCUMENTS

| 2,933,256 | A | * | 4/1960 | McCarty | ................. | F23N 5/067 |
| | | | | | | 236/9 R |
| 3,181,789 | A | * | 5/1965 | Hill | ..................... | F24D 19/1084 |
| | | | | | | 236/10 |
| 3,876,137 | A | * | 4/1975 | Kelly | ..................... | G05D 23/10 |
| | | | | | | 236/48 A |
| 4,527,735 | A | * | 7/1985 | Clark | ................. | G05D 23/1925 |
| | | | | | | 137/554 |
| 5,123,593 | A | * | 6/1992 | Rundle | ................. | F16K 31/002 |
| | | | | | | 236/101 D |

* cited by examiner

*Primary Examiner* — Jonathan Bradford
(74) *Attorney, Agent, or Firm* — Patrick Reilly

(57) ABSTRACT

A device and method enable both an automated and a user controlled diversion of fluid flow from a first pathway to an alternate pathway. The automated method relies upon detection of an environmental quality, such as fluid temperature, fluid heat content, fluid viscosity, fluid chemical composition, flow rate, or other detectable parameter. Both the automated diversion and the user controlled diversion rely upon positioning of the piston relative to the two pathways. The piston defines an internal pathway and the position of the piston internal pathway determines whether fluid flows through the first pathway or the alternate pathway. A lever movably couples the piston to an actuator; in the automated method an actuator responsive to its environment moves the lever to reposition the piston. In the user controlled method an override is applied, preferably manually, to reposition the piston to cause the diversion from the first pathway to the alternate pathway.

20 Claims, 13 Drawing Sheets

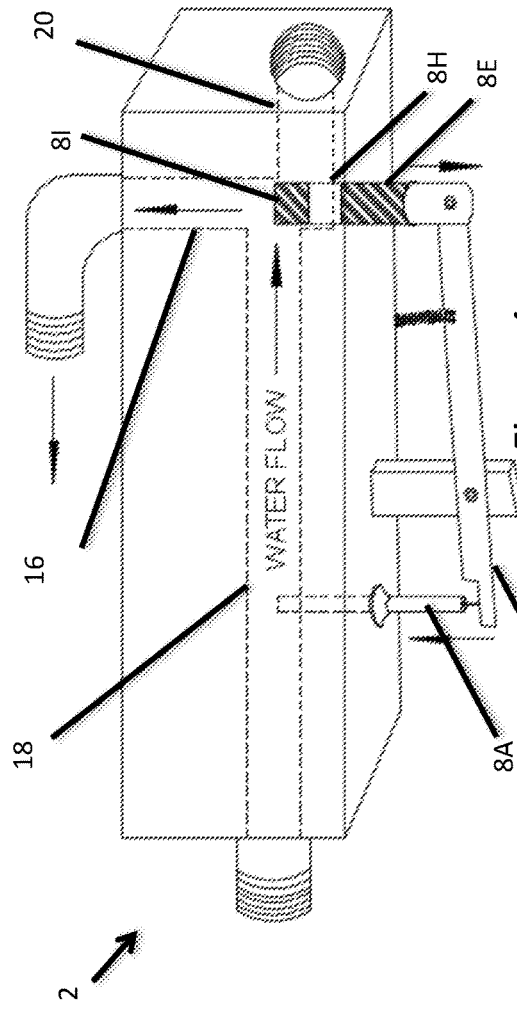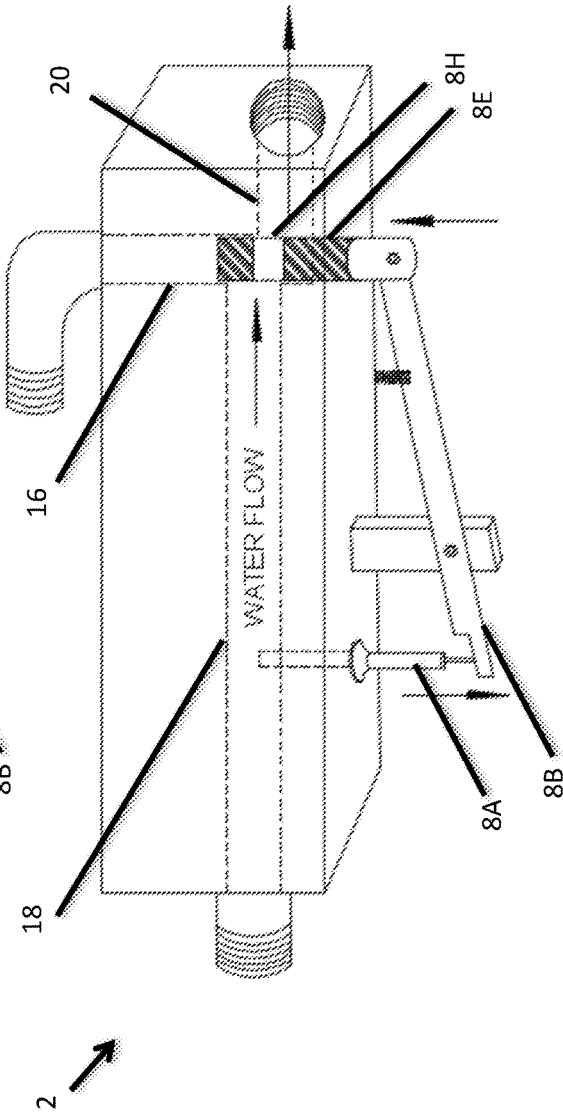

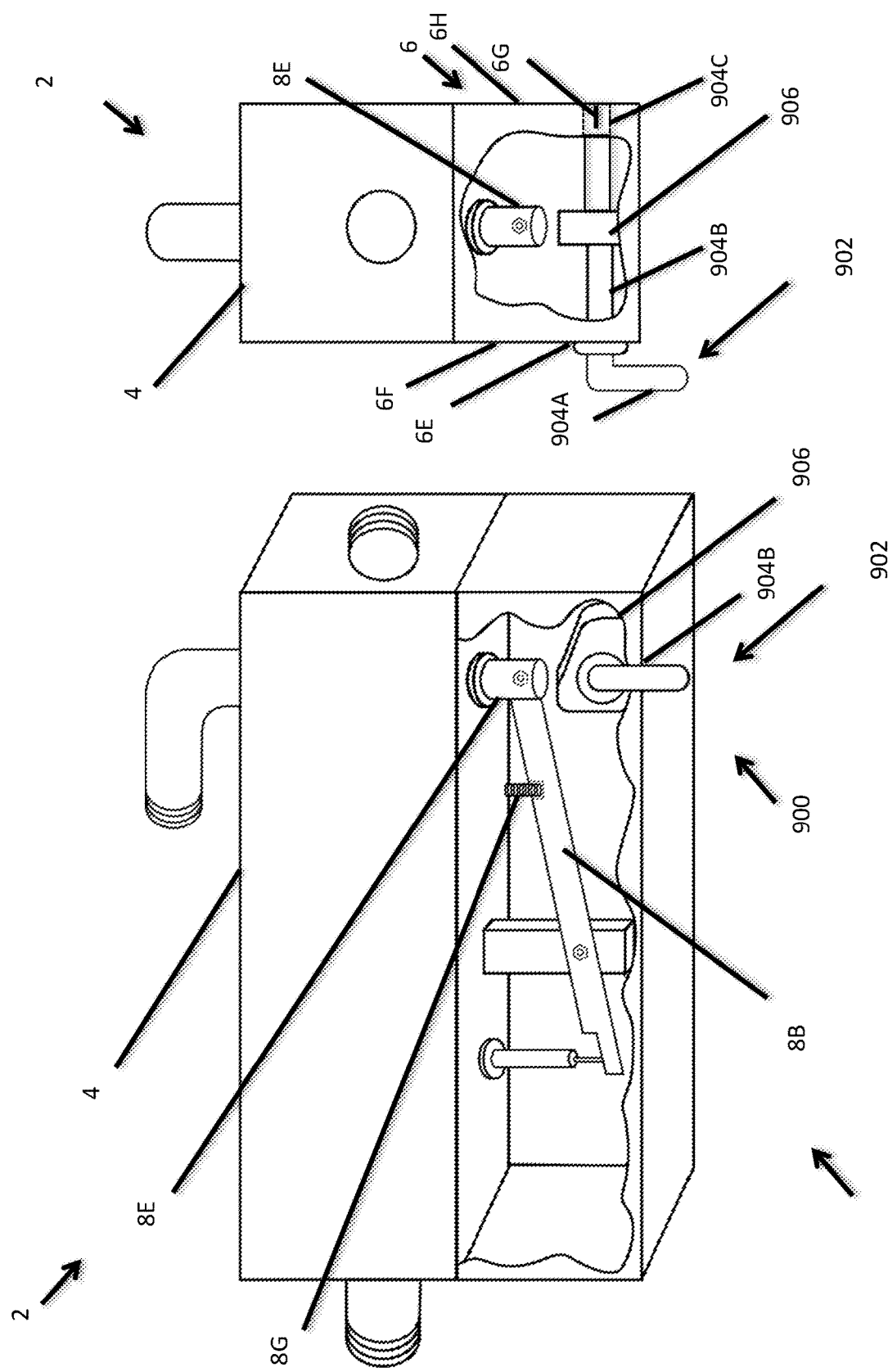

ENVIRONMENTALLY RESPONSIVE FLUID DIVERSION DEVICE AND SYSTEM WITH OVERRIDE CAPABILITY

FIELD OF THE INVENTION

The present invention relates generally to fluid flow management. More particularly the present invention relates to automated and semi-automated fluid control within a plumbing system.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Plumbing systems are widely deployed in industrial, commercial, domestic, institutional and military settings to control the directional flow and delivery of gases and fluids, such as potable water, water based liquid solutions, chemical mixtures, sewage, and other gaseous and fluid materials in singularity and/or in combination and optionally with solid particulate. The prior art includes many automated devices that automatically divert a fluid flow on the basis of a detection or non-detection of a quality of the material flowing past or proximate to an environmentally responsive element. In just one example, offered for the sake of clarity of explanation and not meant as an expression of limitation of the scope of the method of the present invention, the prior art includes devices that selectively divert water between two channel outputs on the basis of a temperature of level heat received by a temperature-reactive actuator. Certain prior art device with this operational characteristic are often designed to automatically channel water above a set temperature or heat density to a shower or a sink output and alternately to divert water below the set temperature or heat density to an alternate channel.

The prior art, however, wholly fails to disclose, motivate or enable the provision of an override of the automatic diversion function to enable a user or system to selectively apply force to alter the fluid flow path as would be caused by the prior art device in the absence of an override dynamic. The prior art thus teaches the insertion of an automated fluid diversion device into a fluid floe environment without optimally providing a means or method to efficiently cancel or alter the automated action of the prior art device on those occasions when an outcome other than that intended by the structure and operation of the prior art device are desirable.

SUMMARY AND OBJECTS OF THE INVENTION

Towards these objects and other objects that will be made obvious in light of the present disclosure, a device, system and method are disclosed that provide an automated function to switch fluid flow from a first pathway to a second pathway upon detection of an environmental quality in combination with a means to alter fluid flow from the first pathway to the second pathway without detection by the present invention (hereinafter, "the invented device") of said environmental quality. In an optional aspect of the method of the present invention (hereinafter, "the invented method"), an override module is provided that allows user to manually control the invented device to direct flow fluid output from the first pathway to the second pathway Certain alternate preferred embodiments of the invented device include an actuator that applies an actuator force to a lever upon detection of or influence of an environmental quality, for example but not limited to a temperature of a fluid flowing in contact with and past the actuator. A biasing element provides a stabilizing force to the same lever in a substantively opposite vector to the actuator force. When the actuator force over comes the stabilizing force, the lever rotates about a fulcrum assembly and causes a piston to change position within a pathway junction. The piston is coupled with the lever at a piston end of the lever that is located distal from the actuator. The movement of the piston can be sufficient to relocate an aperture of the piston to reposition and to thereby divert a direction of fluid flow from a first direction of flow to an alternate direction of flow. In addition, an override module is provided that allows a user or system comprising the invented device to selectively and sufficiently move the piston, independent of the actuator force applied to the lever, to divert fluid flow from the first direction of flow and to the alternate direction of flow. A device body defines the pathway junction through which the fluid flows, and to which the actuator, the lever, the fulcrum assembly, the piston, and optionally the biasing element are directly and/or indirectly coupled or positioned relative to.

In an optional aspect of the invented device, the device body may define (a.) an input channel that enables delivery of a fluid flow into the pathway junction, (b.) a first channel that enables fluid to exit the device, and (c.) an alternate channel that enables the fluid to flow out of the body by an alternate pathway than that provided by the first channel.

Certain other alternate preferred embodiments of the invented method provide a system comprising a sensor that detects one or more environmental qualities and delivers relate signals and/or information to a logic module. The logic module is further communicatively coupled with an actuating means to apply a force to the lever that results in a repositioning of the piston relative to the pathway junction and thereby divert a direction of fluid flow from the first direction of flow to the alternate direction of flow. The override mechanism in these other alternate preferred embodiments of the invented method is selectively applied to also divert a direction of fluid flow from the first direction of flow to the alternate direction of flow and without requiring any force input from the actuating means to the lever.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

INCORPORATION BY REFERENCE

All publications, patents, and patent applications mentioned in this specification are herein incorporated by reference to the same extent as if each individual publication, patent, or patent application was specifically and individually indicated to be incorporated by reference. U.S. Pat. No. 8,876,012 (INVENTOR MCMURTRY, J.; ISSUED Nov. 4, 2014); U.S. Pat. No. 7,934,663 (INVENTOR WILLSFORD, ET AL.; ISSUED MAY. 3, 2011; U.S. Pat. No. 5,274,860 (INVENTOR AVILA, H.; ISSUED Jan. 4, 1994); U.S. Pat.

No. 5,165,456 (INVENTOR WOOLMAN, R.; ISSUED Nov. 24, 1992); U.S. Pat. No. 7,490,373 (INVENTOR ZAVALA-AVELAR, J.; ISSUED Feb. 17, 2009); U.S. Pat. Pub. No. US2011/0139269 (INVENTOR ROGERS, S.; PUBLISHED Jun. 16, 2011); and WIPO Pat. Pub. No. WO 2016/058069 (INVENTOR ROGERS, S.; PUBLISHED Apr. 21, 2016) are incorporated into the present disclosure herein by reference in their entirety and for all purposes.

BRIEF DESCRIPTION OF THE FIGURES

These, and further features of the invention, may be better understood with reference to the accompanying specification and drawings depicting the preferred embodiment, in which:

FIG. 4 is a partial cut away front perspective view of the first device of FIG. 1 in the first state of enabling fluid flow out of the diversion channel;

FIG. 5 is a partial cut away front perspective view of the first device of FIG. 1 in the second state of enabling fluid flow out of the output channel;

FIG. 9A is a partial cut away front perspective view of the first device of FIG. 1 with an in a state of disengagement with the movable piston of FIG. 2;

FIG. 9B is a partial cut away side plan view of the first device of FIG. 1 with the of FIG. 9A in a state of disengagement with the movable piston of FIG. 2;

DETAILED DESCRIPTION

Figure 1:
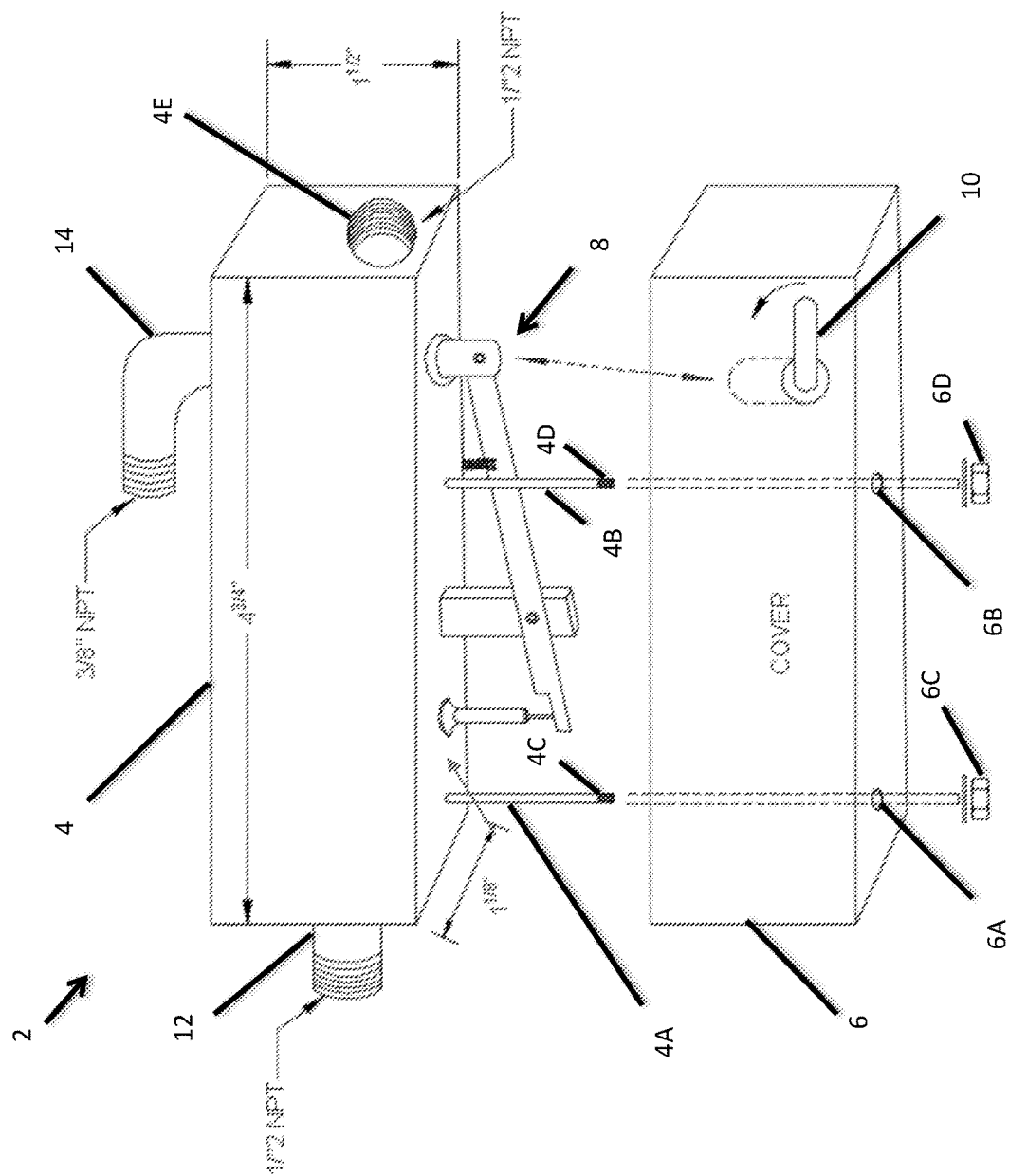
FIG. 1 is a front perspective exploded view of a first preferred embodiment of the present invention, or first device, and displaying a lever.

Referring now generally to the Figures and particularly to FIG. 1, FIG. 1 is a front perspective exploded view of a first preferred embodiment of the present invention 2, (hereinafter, "first device" 2). The first device includes a body 4 and a cover 6. The cover 6 is detachably attachable to the body 4 and is shaped to substantively enclose 5 sides a diversion assembly 8 of the first device 2 when the cover 6 is attached to the body 4. A pair of posts 4A & 4B extend from the body and each present threaded ends 4C & 4D. Each post 4A & 4B is shaped to extend through one of a pair of cover apertures 6A & 6B. The body 4 further includes a tapped output aperture 4E.

A pair of tapped cover nuts 6C & 6D are sized and shaped to removably engage with each of the post threaded ends 4C & 4D; the pair of tapped cover nuts 6C & 6D are oversized relative to the pair of cover apertures 6A & 6B to insure that the tapped cover nuts 6C & 6D can not pass through the pair of cover apertures 6A & 6B. A cover control aperture 6E is positioned within the cover 6 to accommodate a protrusion of an override lever 10 of the diversion assembly 8 as required to provide manual access to the override lever 10 by a user.

Figure 2:
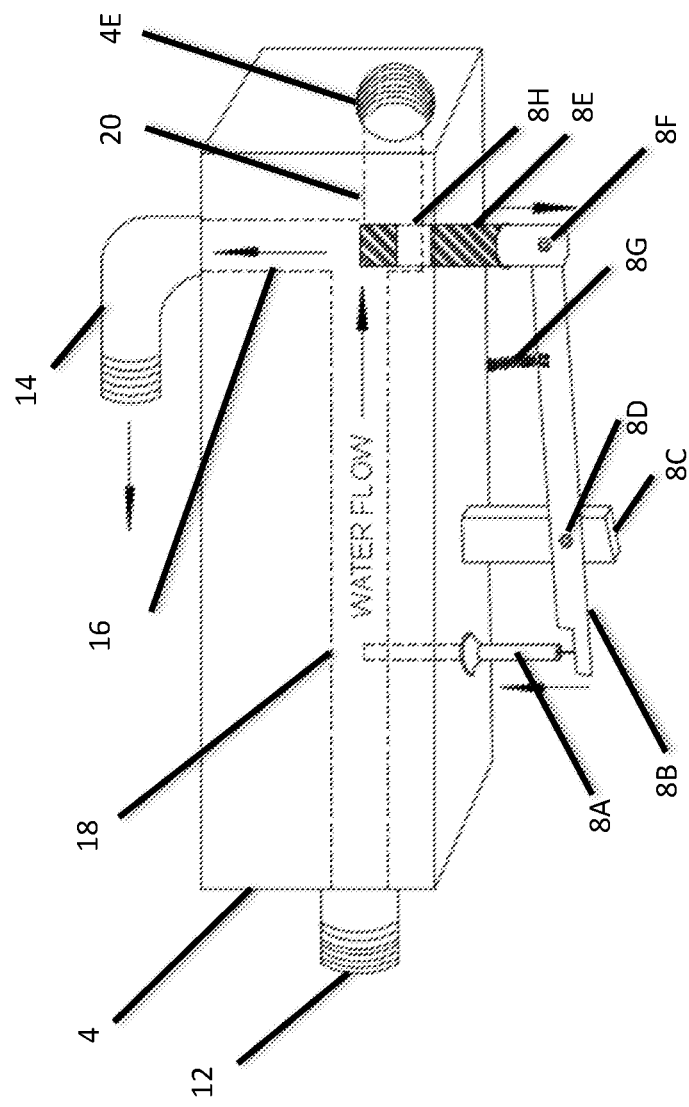
FIG. 2 is a partial cut away front perspective view of the first device of FIG. 1 in a first state of enabling fluid flow out of a diversion channel and presenting a movable piston.

A threaded input pipe 12 extends from the body 4 as does a threaded diversion pipe 14. Referring now generally to the Figures and particularly to FIG. 2, FIG. 2 is a partial cut away front perspective view of the first device 2 in a state of enabling fluid flow out of a diversion channel 16 that extends from the body 4 and feeds fluid directly into the threaded diversion pipe 14. An input channel 18 extends through the threaded input pipe 12 and fully through the body 4 to the diversion channel 16. An output channel 20 extends from and enables fluid flow from the input channel 18. The output channel 20 includes the tapped output aperture 4E and enables fluid flow from the input channel 18 and out of the tapped output aperture 4E.

The diversion assembly 8 includes a temperature-reactive actuator 8A that is positioned to deliver force to and move a lever 8B. The lever 8B is rotatably coupled to a fulcrum extension 8C that is attached to and extends from the body 4. A fulcrum pin 8D extends through both the lever 8B and the fulcrum extension 8C and forms a rotatable coupling of the lever 8B and the fulcrum extension 8C. A piston 8E is rotatably coupled to the lever 8B distally from the temperature-reactive actuator 8A, whereby the fulcrum extension 8C is disposed between the temperature-reactive actuator 8A and the piston 8E. A spring element 8G disposed between the fulcrum extension 8C and the piston 8E; the spring element 8G is attached at opposite ends to both the body 4 and the lever 8B provides a compressive force to the lever 8B that has a dominant vector direction component oriented away from the body 4. The spring force received from the spring element 8G tends to push the lever 8B to rotate about the fulcrum pin 8F so at to pull the piston 8E out of the body 4.

The temperature-reactive actuator 8A may be or comprise a Vernet 5701™ fluid thermal actuator as marketed by Vernet Corporation of Columbus, Ind., or other suitable temperature-reactive actuator known in the art. The body 4 and the cover 6 may be made of brass, aluminum, thermoplastic, or other suitable metal, metal alloy, synthetic, or plastic material known in the art in singularity or is combination. Additional elements of the first device 4A, 4B. 6C, 6D, 8A-8E, 12 & 14 may be made of brass, aluminum, thermoplastic, or other suitable metal, metal alloy, synthetic, or plastic material known in the art in singularity or is combination.

The first device 2 is presented in FIG. 2 in a first state wherein the lever 8B is not receiving force from the temperature-reactive actuator 8A and the spring force is influencing the lever 8B to pull the piston 8E in a direction away from the input channel 18 in the first state of FIG. 2 a piston canal 8H is not exposed to the input channel 18 and the piston 8E blocks fluid from flowing from the input channel 18 and to the output channel 20, whereby fluid flow from the input channel 18 and into the diversion channel 16 is enabled.

Figure 3:
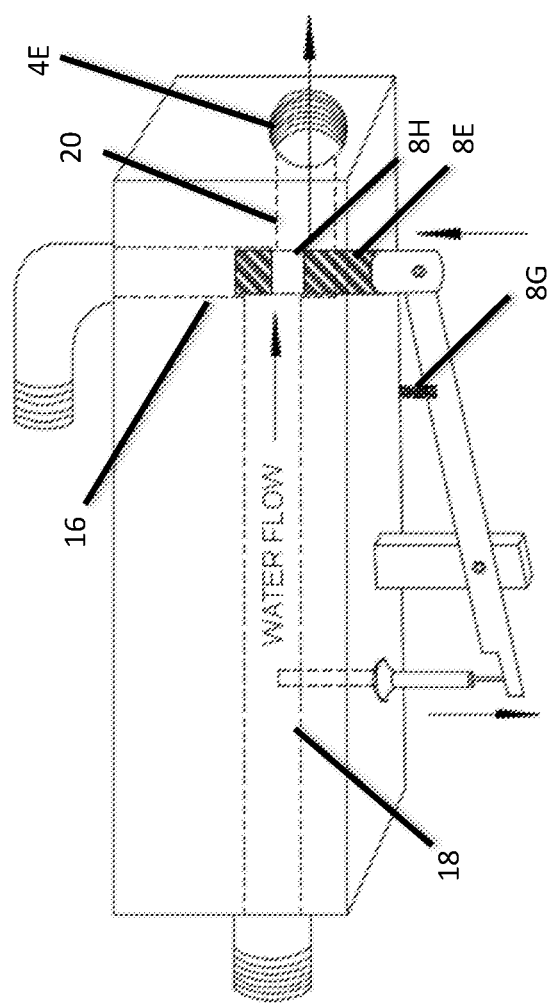
FIG. 3 is a partial cut away front perspective view of the first device of FIG. 1 in a second state of enabling fluid flow out of an output channel.

Referring now generally to the Figures and particularly to FIG. 3, FIG. 3 is a partial cut away front perspective view of the first device 2 in a second state wherein fluid flow is enabled through the input channel 18 and out of the output channel 20 via the tapped output aperture 4E. In the second state, force received by the lever 8B drives against the spring force received by the lever 8B from the spring element 8G sufficiently to cause the lever 8B to push the piston 8E into a position relative to the input channel 18 to enable fluid flow through the input channel 18 and the piston canal 8H and into the output channel 20. Additionally, in the second state of the first device 2 the piston 8E is positioned to block fluid flow from the input channel 18 and into the diversion channel 16.

Referring now generally to the Figures and particularly to FIG. 4, FIG. 4 is a partial cut away front perspective view of the first device 2 of FIG. 1 in the first state wherein fluid flows from the from the input channel 18 and into the diversion channel 16 is enabled. A piston head 81 of the piston 8 is positioned distally from the lever 8B and located such that the piston canal 8H is disposed between the piston head 81 and the lever 8B. The piston head 81 is sized and shaped to block fluid flow between the output channel 20 and the input channel 18 when the first device 2 is in the first state of FIG. 2 and FIG. 4.

Referring now generally to the Figures and particularly to FIG. 5, FIG. 5 is a partial cut away front perspective view of the first device 2 of FIG. 1 in the second state wherein fluid flow from the from the input channel 18 and into the output channel 10 is enabled. In the second state force received by the lever 8B from the temperature-reactive actuator 8A is sufficient to cause the lever 8B to drive the piston 8E and into a location within the body 4 wherein the piston canal 8H is positioned between the input channel 18 and the output channel 20 and fluid flow from the input channel 18 and the output channel 20 is enabled. The piston head 81 is sized and shaped to block fluid flow between the output channel 20 and the diversion channel 16 when the first device 2 is in the second state of FIG. 1 and FIG. 3.

Figure 6:
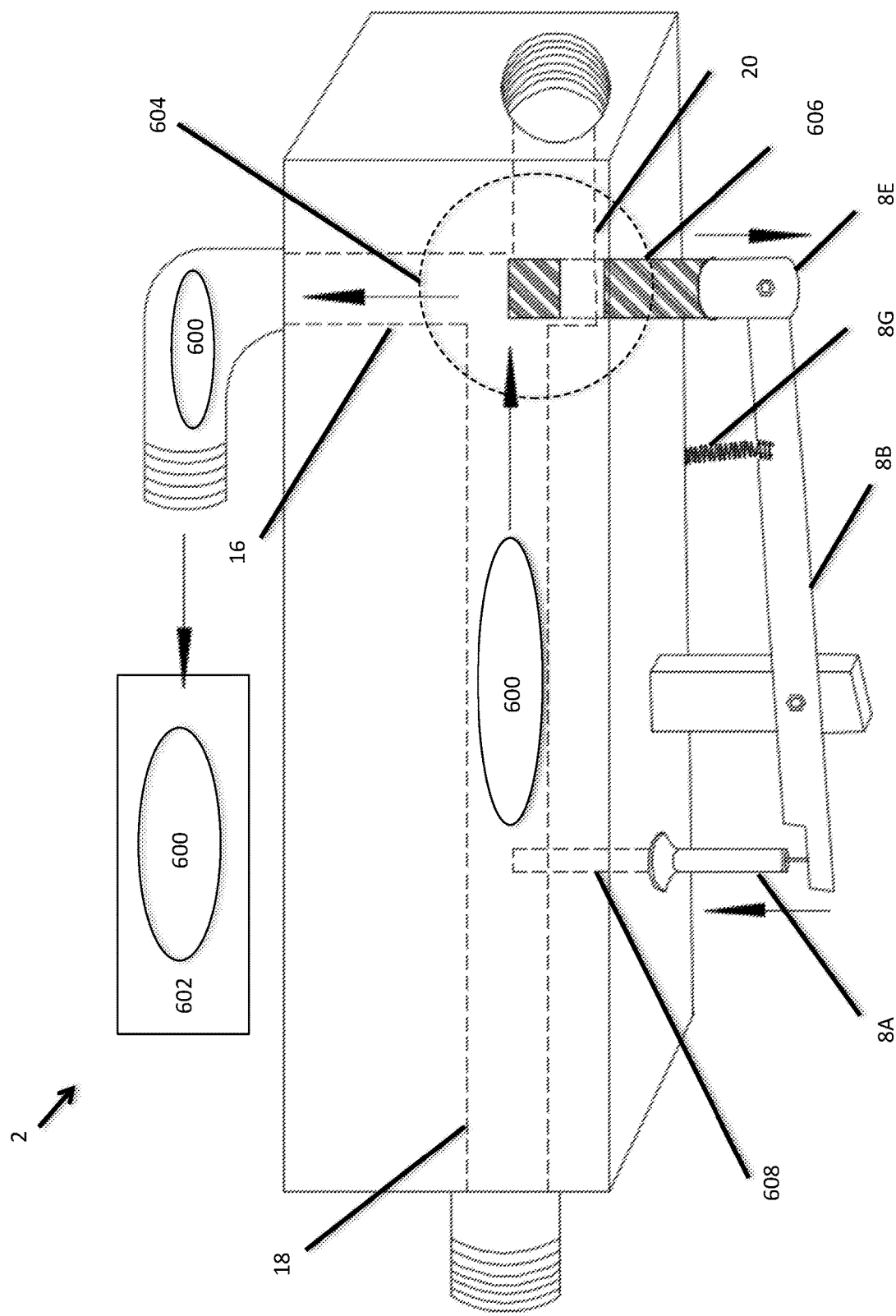
FIG. 6 is a partial cut away front perspective view of the first device of FIG. 1 in a state of enabling water below a selected temperature out of the diversion channel and toward a water recovery storage location.

Referring now generally to the Figures and particularly to FIG. 6, FIG. 6 is a partial cut away front perspective view of the first device 2 in a state of enabling cold water 600, i.e., cold water 600 indicated by the temperature-reactive actuator 8A to be below a preselected temperature, received under pressure at the input channel 18 to flow into the diversion channel 16 and toward a water recovery storage location 602. A junction 604 is formed by the intersection of the diversion channel 16, the input channel 18 and the output channel 20. A piston channel 606 extending through the body 4 and into the junction 604 seats the piston 8E and enables the piston 8E to be dynamically positioned and repositioned relative to the junction 604. An optional piston seal ring (not shown) may be positioned within the piston channel 606, between the piston 8E and the piston channel 606 and through which the piston 8E fully extends; the primary function of the piston seal ring is to reduce leakage of fluid, e.g., the cold water 600, from the junction 604 and out of the piston channel 606.

The actuator 8A extends fully through, and a partial length of the actuator 8A is press fit into, a sensor channel 608 of the body 4 whereby a part of the actuator 8A is exposed to the cold water 600 within the input channel 18. An optional actuator seal ring (not shown) may be positioned within the sensor channel 608, between the actuator 8A and the sensor channel 608 and through which the actuator 8A fully extends; the primary function of the actuator seal ring is to reduce leakage of fluid, e.g., the cold water 600, from the inner channel 18 and out of the sensor channel 608.

Figure 7:
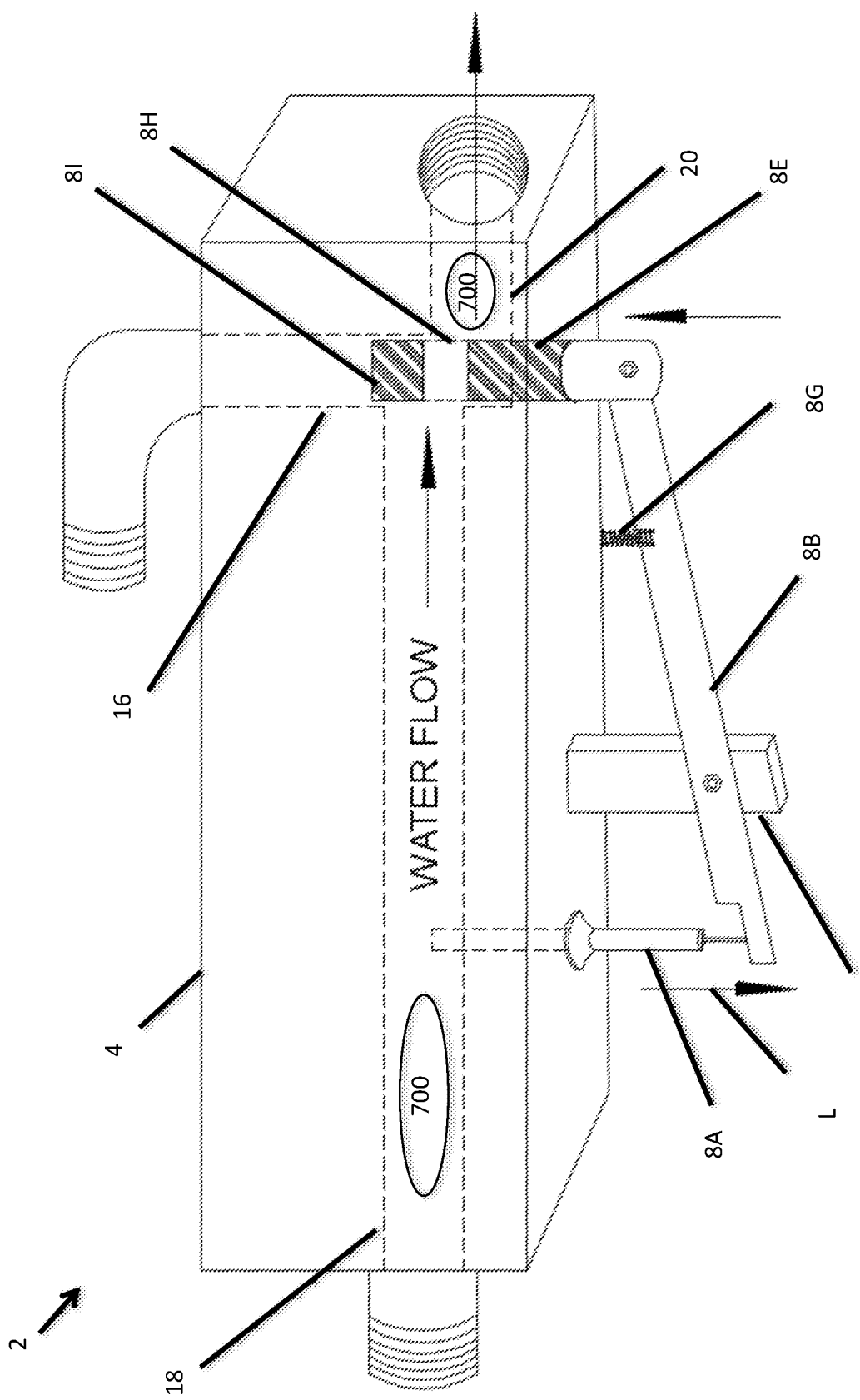
FIG. 7 is a partial cut away front perspective view of the first device of FIG. 1 in a state of enabling water above a selected temperature out of the output channel and out of an output channel.

Referring now generally to the Figures and particularly to FIG. 7, FIG. 7 is a partial cut away front perspective view of the first device 2 in a state of enabling hot water 700, i.e., hot water 700 indicated by the temperature-reactive actuator 8A to be below a preselected temperature, received under pressure at the input channel 18 to flow into and out of the output channel 16. It is understood that heat transferred from the hot water 700 to the temperature-reactive actuator 8A causes the temperature-reactive actuator 8A to extend in length along an elongate axis L and away from the input channel 18 sufficiently to drive the lever 8B to rotate about the fulcrum extension 8C and to both (a.) compress the compressive spring element 8G, and (b.) drive the piston 8E within the piston channel 606 toward the diversion channel 16. In the position of the piston 8E within the body 4 as forced by the temperature-reactive actuator 8A, the piston head 81 is blocking flow of the hot water 700 from entering the diversion channel 16 and the piston canal 8H is positioned to enable flow of the hot water 700 through the piston 8E and into the output channel 20.

It is understood that for the clarity of illustration that the cold water 600 in FIG. 6 an the hot water 700 in FIG. 7 are shown in a partial volumetric representation within the body, whereas in common operation of the invented device 2 the cold water 600 and hot water 700 is received under pressure into the inner channel 18 and the cold water 600 and hot water 700 would each fill more than 98% of the volume of the inner channel 18.

Figure 8:
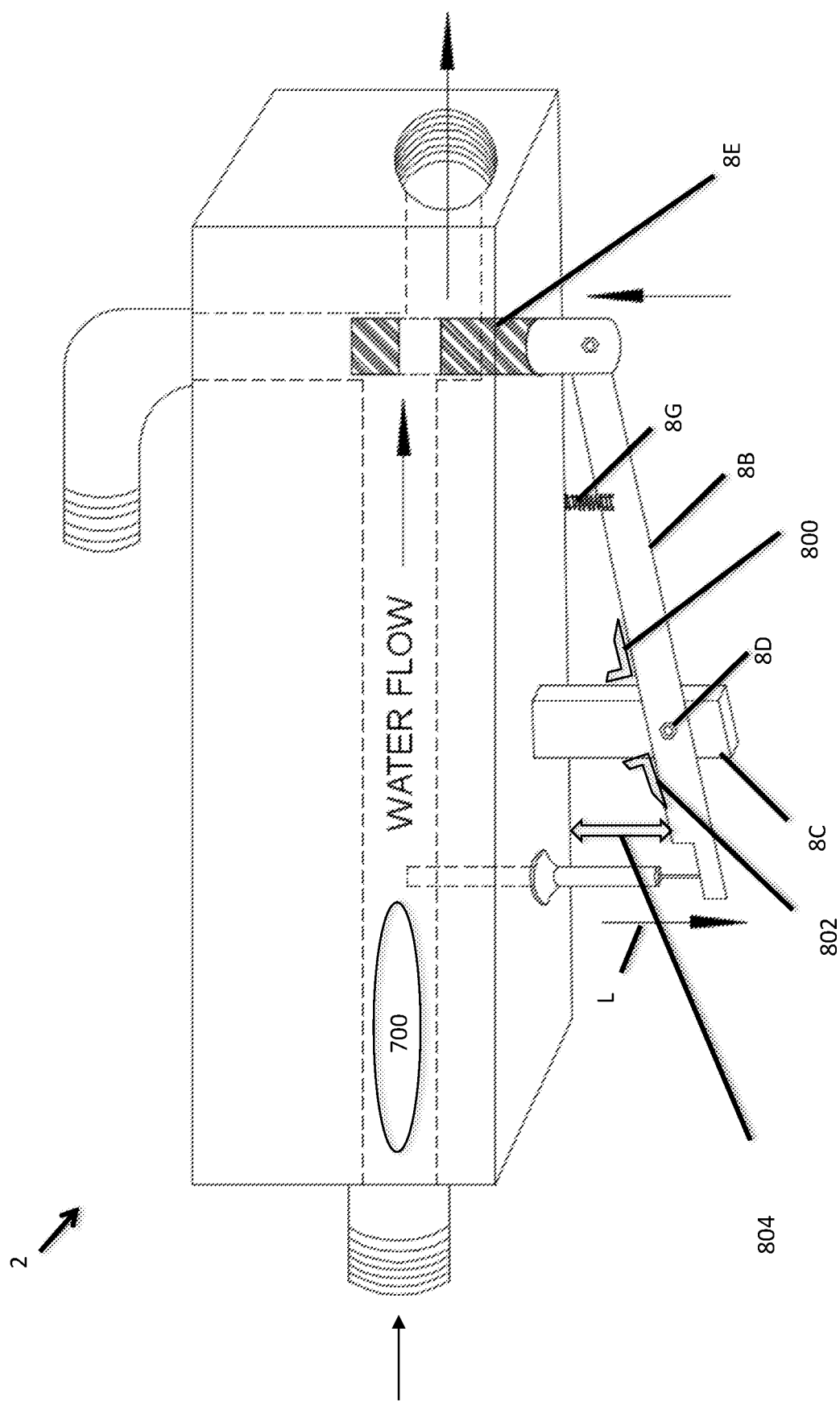
FIG. 8 is a partial cut away front perspective view of a variation of the first device FIG. 1 with optional torsion springs and an optional tensile spring element and in the first state of enabling cold water flow out of the diversion channel and toward a water recovery storage location.

Referring now generally to the Figures and particularly to FIG. 8, FIG. 8 is a partial cut away front perspective view of a variation of the first device 2 that further includes optional torsion springs 800 & 802 and an optional tensile spring element 804 and in the second state of enabling hot water 700 to flow out of the diversion channel 16.

A compressive torsion spring 800 and a tensile torsion spring 802 are each attached to both the fulcrum extension 8 and the lever 8B whereby a rotational torsion force of a same direction is applied by both the compressive torsion spring 800 and that tensile torsion spring 802 that forces the lever 8B to apply compressive force directed toward the body 4 and against the temperature-reactive actuator 8A. A tensile spring 804 and the compressive spring element 8G are each separately attached at opposing ends respectively to the lever 8B and the body 4 whereby a force is applied by both the compressive torsion spring 800 and that tensile torsion spring 802 that forces the lever 8B to apply compressive force directed toward the body 4 and against the temperature-reactive actuator 8A.

It is understood the compressive spring element 8G and the compressive torsion spring 800 each apply compressive force that has a dominant vector direction to rotate the lever 8B about the fulcrum pin 8D in a direction to apply compressive force directed toward the body 4 and against the temperature-reactive actuator 8A. It is further understood the tensile torsion spring 802 and the tensile spring 804 each apply tensile forces to the lever 8B that has a dominant vector direction to rotate the lever 8B about the fulcrum pin 8D in a direction to apply compressive force directed toward the body 4 and against the temperature-reactive actuator 8A.

Various alternate preferred embodiments of the present invention include one, two, three or all of the springs 800, 802, 804 & 8G.

Referring now generally to the Figures and particularly to FIG. 9A, FIG. 9A is a partial cut away front perspective view of the first device of FIG. 1 with an in a state of disengagement with the movable piston 8E, whereby the piston 8E is positioned under the separate influences of the force received by the lever 8B from the temperature-reactive actuator 8A and the force received by the lever 8B from the compressive spring element 8G, and optionally or alternatively from one or more alternative springs 800, 802 & 804, and the piston 8E is not receiving force from the override assembly 900.

Referring now to FIGS. 9A and 9B, the override assembly 900 includes a manual handle 902 having a grip element 904A, an elongate handle element 904B and a hollow tubular end 904C. The grip element 904A and the hollow tubular end 904C are formed at opposing ends of the elongate handle element 904B. The grip element 904A, the hollow tubular end 904C and the elongate handle element 904B are preferably formed as a unitary piece. An asymmetric cam 906 is fixedly coupled to the elongate handle element 904A.

It is understood that in the state of disengagement of the override assembly 900 the cam 906 is neither contacting nor applying force to the piston 8E to cause the piston 8E to move toward the junction 604 and in the direction of the diversion channel 16. It is further understood that the override assembly 900 while in the disengagement state as shown of FIGS. 9A and 9B does not interfere in anyway with the influence of the lever 8B and any and all forces transferred via the lever 8B to move, position, or reposition the piston 8E with the piston channel 606. It is also understood that the cam 906 is preferably shaped and sized so that when the override assembly 900 is placed in the disengagement position of FIGS. 9A and 9B the cam 906 will neither contact nor apply force against the diversion assembly 8 at any point throughout the entire the operational range of motion of the lever 8E as directed by forces received form the actuator 8A nor any spring 8E, 800, 802, & 804.

Referring now generally to the Figures and particularly to FIG. 9B, FIG. 9B is a partial cut away side plan view of the first device 2 further comprising the override assembly 900 in a state of disengagement with the movable piston 8E, whereby the piston 8E is positioned under the separate influences of the force received by the lever 8B from the temperature-reactive actuator 8A and the force received by the lever 8B from the compressive spring element 8G, or optionally alternative or additional springs 800, 802 & 804, and the piston 8E is not receiving force from the override assembly 900.

The manual handle 902 extends through a handle cover aperture 6E located in a first cover side 6F of the cover 6. The manual handle 902 further extends within the cover 6 toward, and partially encloses, an internal cover pin 6G of the cover 6. The cover pin 6G is fixedly coupled with a second cover side 6H and extends along an elongate dimension toward the handle cover aperture 6E. The cover pin 6G is placed to extend within the elongate tubular cavity of the hollow tubular end 904C of the manual handle 902. The manual handle 902 is thereby rotatably coupled generally with the cover 6 in general and particularly with the cover pin 6G. It is noted that the cam 906 is attached to the manual handle 902 between the first cover side 6F and the second cover side. As the cam 906 is fixedly attached to the manual handle 902, the cam 906 rotates in relation to the cover pin 6G in unitary rotation with any rotation of the manual handle 902 is about the cover pin 6G. The grip element 904A is preferably shaped and sized to enable manual rotation of the override assembly 900 by a human user gripping and rotating the grip element 904A in about an axis that passes centrally through and along the elongate dimension of the cover pin 6G.

Figures 10A, 10B:
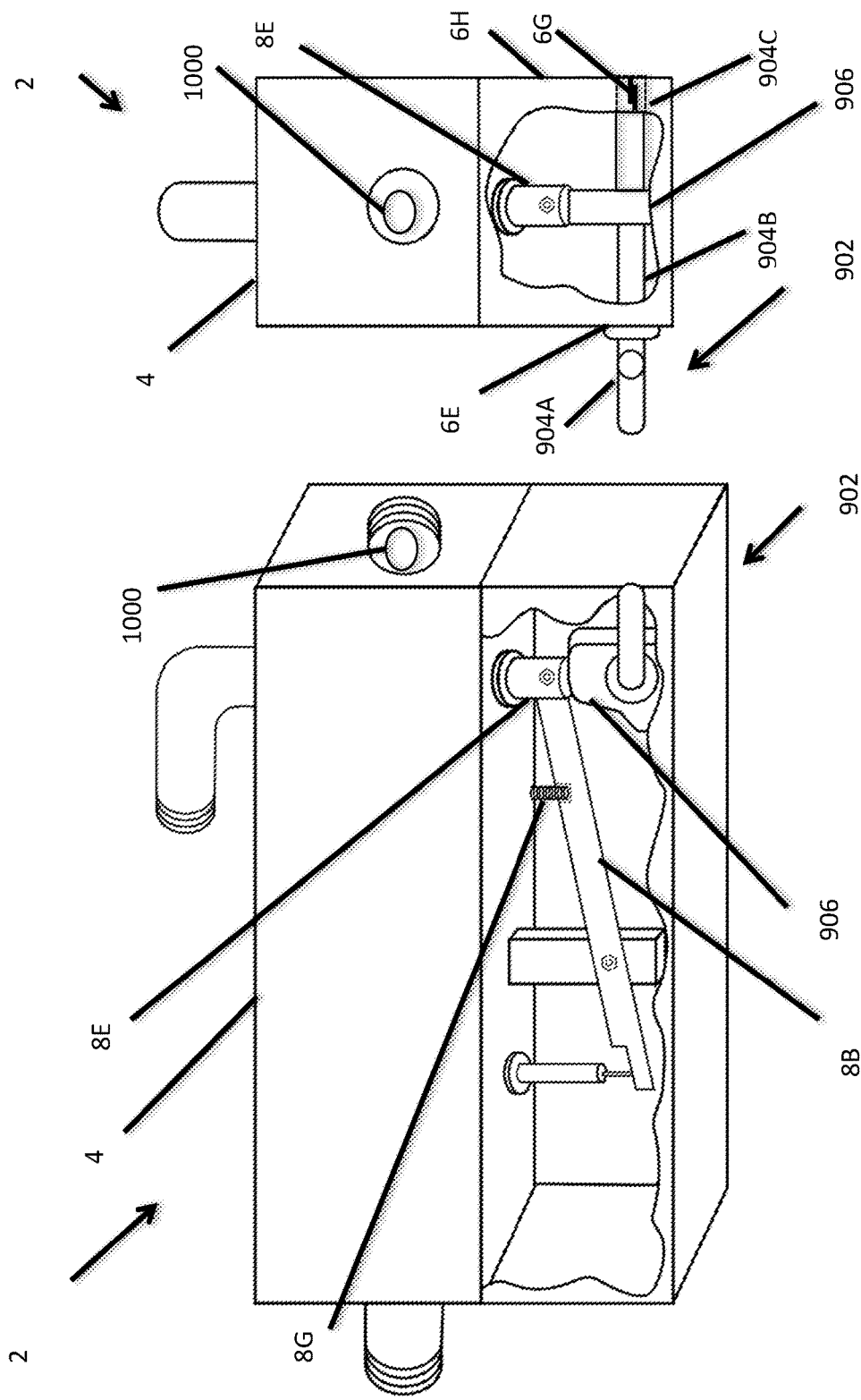
FIG. 10A is a partial cut away front perspective view of the first device of FIG. 1 with the of FIG. 9A in a state of engagement with the movable piston of FIG. 2.
FIG. 10B is a partial cut away side plan view of the first device of FIG. 1 with the of FIG. 9A a in a state of engagement with the movable piston of FIG. 2.

Referring now generally to the Figures and particularly to FIG. 10A, FIG. 10A is a partial cut away side plan view of the first device of FIG. 1 and showing the override assembly 900 engaging with and positioning the piston 8E, whereby the cam 906 is rotated by manual rotation of the grip handle 904A to place the cam 906 into the engagement position that forces the piston 8E to move within the piston channel 606 and toward the diversion channel 16; as a consequence of the positioning of the cam 906 in the state of engagement of FIGS. 10A and 10B the override assembly 900, the piston head 81 is positioned within the body 4 to block flow of a fluid 1000 into the diversion channel 16 and to enable flow of the fluid 1000 through the piston canal 8H into the output channel 20 regardless of the simultaneous orientation and position of the lever 8B in relation to the piston 8E.

Referring now generally to the Figures and particularly to FIG. 10B, FIG. 10B is a partial cut away side plan view of the first device 2 further comprising the override assembly 900 in a state of engagement with the piston 8E, wherein the piston 8E is positioned to both (a.) cause the head 81 to block flow of the fluid 1000 into the diversion channel 16, and (b.) enable flow of the fluid 1000 through the piston canal 606 into the output channel 20.

Figure 11:
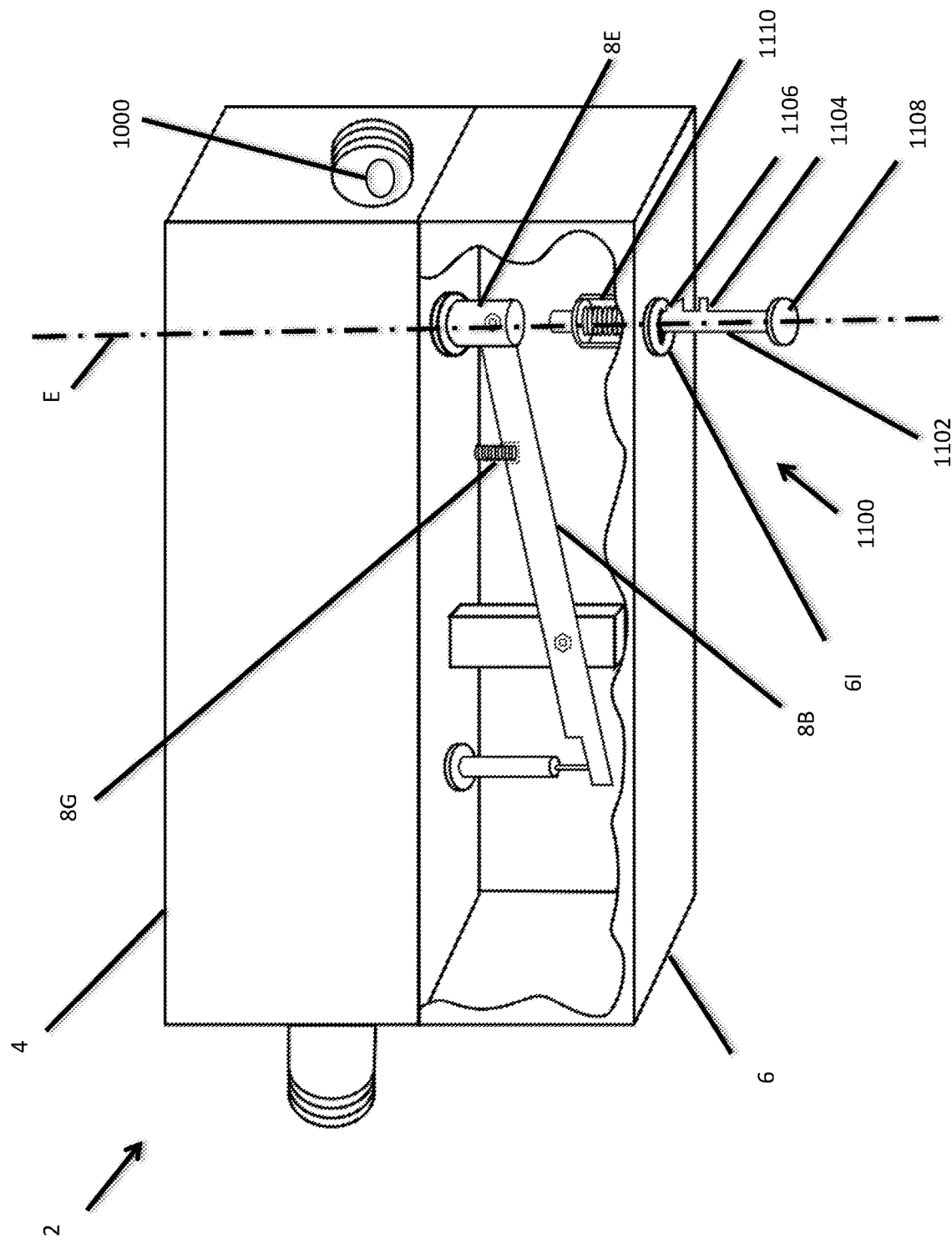
FIG. 11 is a partial cut away front perspective view of the first device of FIG. 1 combined with a second in a state of disengagement with the movable piston of FIG. 2.

Referring now generally to the Figures and particularly to FIG. 11, FIG. 11 is a partial cut away front perspective view of the first device 2 combined with a second override assembly 1100 in a state of disengagement with the piston 8E, whereby the piston 8E is positioned under the separate influences of the force received by the lever 8B from the temperature-reactive actuator 8A and the force received by the lever 8B from the compressive spring element 8G, and optionally or alternatively from one or more alternative springs 800, 802 & 804, and the piston 8E is not receiving force from the second override assembly 1100.

Figure 12:
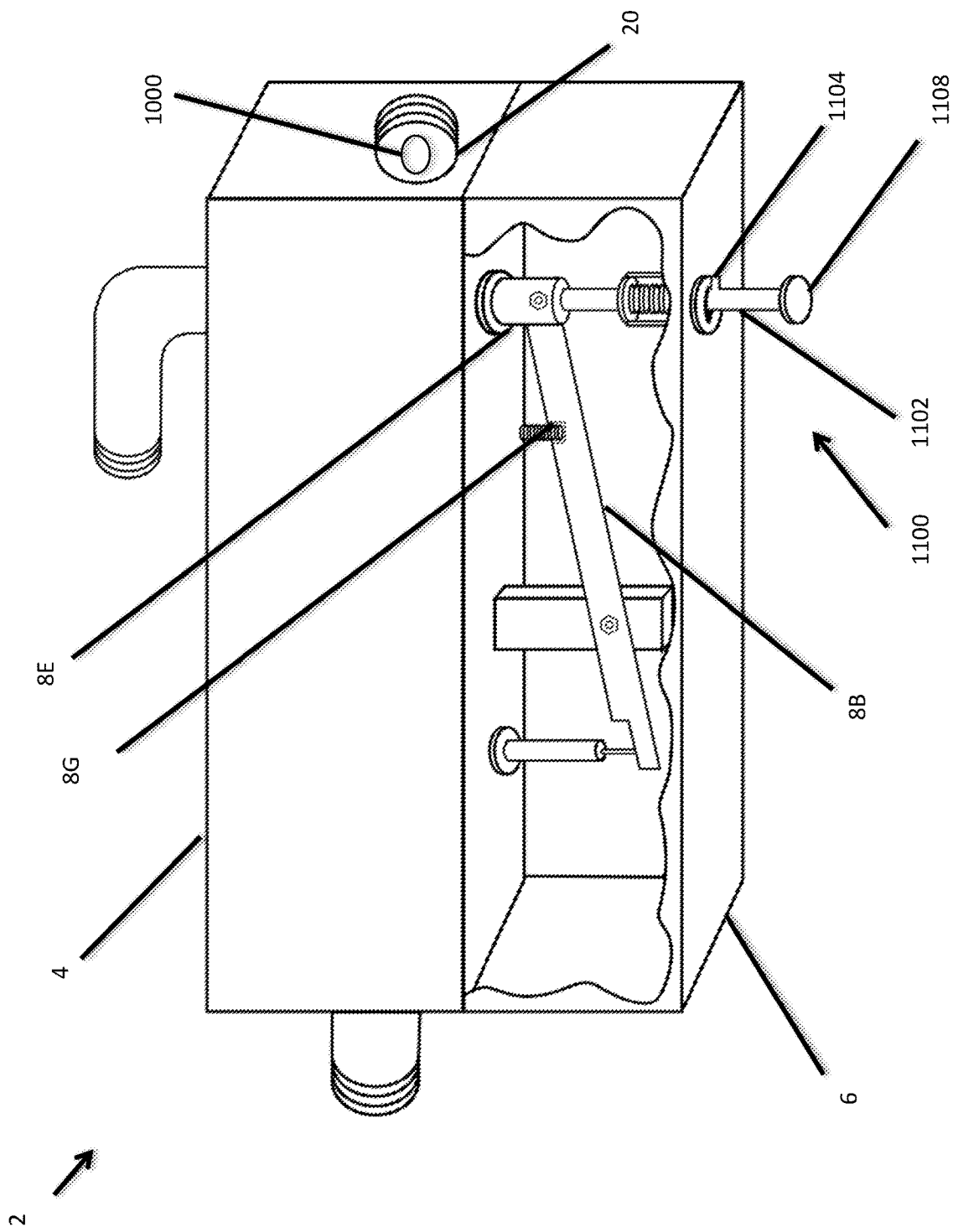
FIG. 12 is a partial cut away front perspective view of the first device of FIG. 1 combined with the second of FIG. 11 in a state of engagement with the movable piston of FIG. 2.

Referring now to FIGS. 11 and 12, the second override assembly 1100 includes an elongate post 1102 that includes a first extension 1104 and a second extension 1106. The first extension 1104 and the second extension 1106 extend normally away from a central elongate axis E of the elongate post 1102. A thumb button plate 1108 extending from the post 1102 is positioned distally from the body 4 and increases the ease with which a user may push the post 1102 toward the piston 8E. A spring loaded attachment assembly 1110 is attached to the cover 6 distally from the thumb button plate 1108 and is attached to the cover 6. The post 1102 extends fully through the spring loaded attachment assembly 1110.

A cover post aperture 61 is oversized relative to the second override assembly 1100 to permit both the post 1102 and the second extension 1106 to be slidably positioned and repositioned along the elongate axis E. More particularly, the cover post aperture 61 allows manual insertion of the second extension 1106 past the cover 6 and in the direction of the piston 8E, whereby the cover 6 is optionally disposed between the first extension 1104 and the second extension 1106 when the second override assembly 1100 is placed into the state of engagement state of the second override assembly 1100 with the piston 8E as shown in FIG. 12.

Referring now generally to the Figures and particularly to FIG. 11, it is understood that in the state of disengagement of the second override assembly 1100 the post 1102 is neither contacting nor applying force to the piston 8E to cause the piston 8E to move toward the junction 604 nor to move the piston 8E in the direction of the diversion channel 16. It is further understood that the second override assembly 1100 while in the disengagement state as shown of FIG. 11 does not interfere in anyway with the influence of the lever 8B and any and all forces transferred via the lever 8B to move, position, or reposition the piston 8E with the piston channel 606. It is also understood that the post 1102 is preferably shaped and shaped so that the second override assembly 1100 is placed in the disengagement position of FIG. 11 the post 1102 will neither contact nor apply force against the diversion assembly 8 at any point throughout the entire the operational range of motion of the lever 8E as directed by forces received form the actuator 8A nor any spring 8E, 800, 802, & 804.

Referring now generally to the Figures and particularly to FIG. 12, FIG. 12 is a partial cut away front perspective view of the first device 2 combined with the second override assembly 1100 in a state of engagement with the piston 8E, wherein the force delivered by the manual insertion of the post 1102 to the piston 8E and toward the body 4 overcomes any opposing force simultaneously received by the lever 8B form any spring element 8G and/or spring 800, 802 & 804 of diversion assembly 8. The first extension 1104 and the second extension 1106 are sufficiently displaced from each other to enable the cover 6 to be disposed between the first extension 1104 and the second extension 1106 at the cover post aperture 61 when the post 1102 is placed into the state of engagement with the piston 8E as shown in FIG. 12. As a consequence of the positioning of the post 1102 into contact with the piston 8E and into the state of engagement of FIG. 12, the piston head 81 is positioned within the body 4 to block flow of the fluid 1000 into the diversion channel 16 and to enable flow of the fluid 1000 through the piston canal 8H into the output channel 20 regardless of the simultaneous orientation and position of the lever 8B in relation to the piston 8E.

FIG. 12 presents the override assembly 110 in the state of engagement with the piston 8E, wherein the piston 8E is positioned to both (a.) cause the head 81 to block flow of the fluid 1000 into the diversion channel 16, and (b.) enable flow of the fluid 1000 through the piston canal 606 into the output channel 20.

Figure 13:
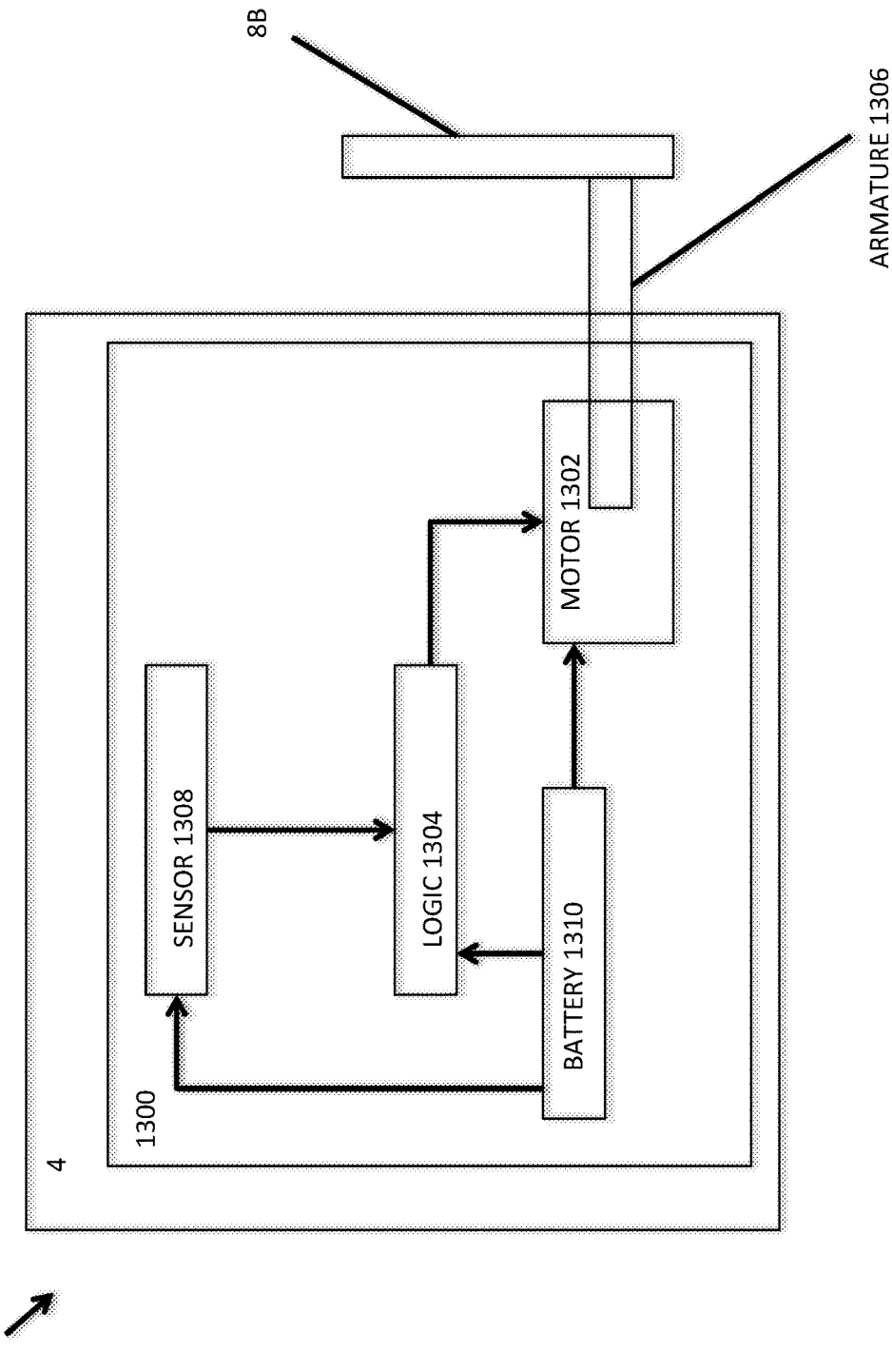
FIG. 13 is a block diagram of a sensor-informed logic module with a controller motor that selectively applies force to the lever as directed by a logic circuit to cause a repositioning of the movable piston of FIG. 2.

Referring now generally to the Figures and particularly to FIG. 13, FIG. 13 is a block diagram of a sensor-informed logic module 1300 with a controller motor 1302 that selectively applies force to the lever 8B as directed by a logic circuit 1304 to cause a repositioning of the piston 8E. The controller motor 1302 as directed by the logic circuit 1304 drives an armature 1306 alternately against or away from the lever 8B, whereby the piston 8E is alternately pushed toward or pulled away from the input channel 16.

The logic module is coupled with the body 4 and an environmental sensor 1308 is exposed to the input channel 16. The environmental sensor 1308 (hereinafter, "the sensor" quality) is selected to detect the presence and/or measure a concentration or level of one or more environmental qualities of the fluid 1000 or water 600 & 700 found within the inner channel 16. The sensor 16 may be adapted to measure one or more qualities of temperature, heat density, viscosity pH, concentration or a minimal presence of one or more solutes, concentration or a minimal of one or more types of particulates by size and/or chemical composition and/or other suitable detectable or measure environmental quality known in the art.

The logic circuit 1304 is communicatively coupled with the controller motor 1302 and the sensor 1306. The logic sensor stores one or more values used for comparison in steps 14.04 and 14.14 in comparisons with quality detections and/or parametric measurement values.

Figure 14:
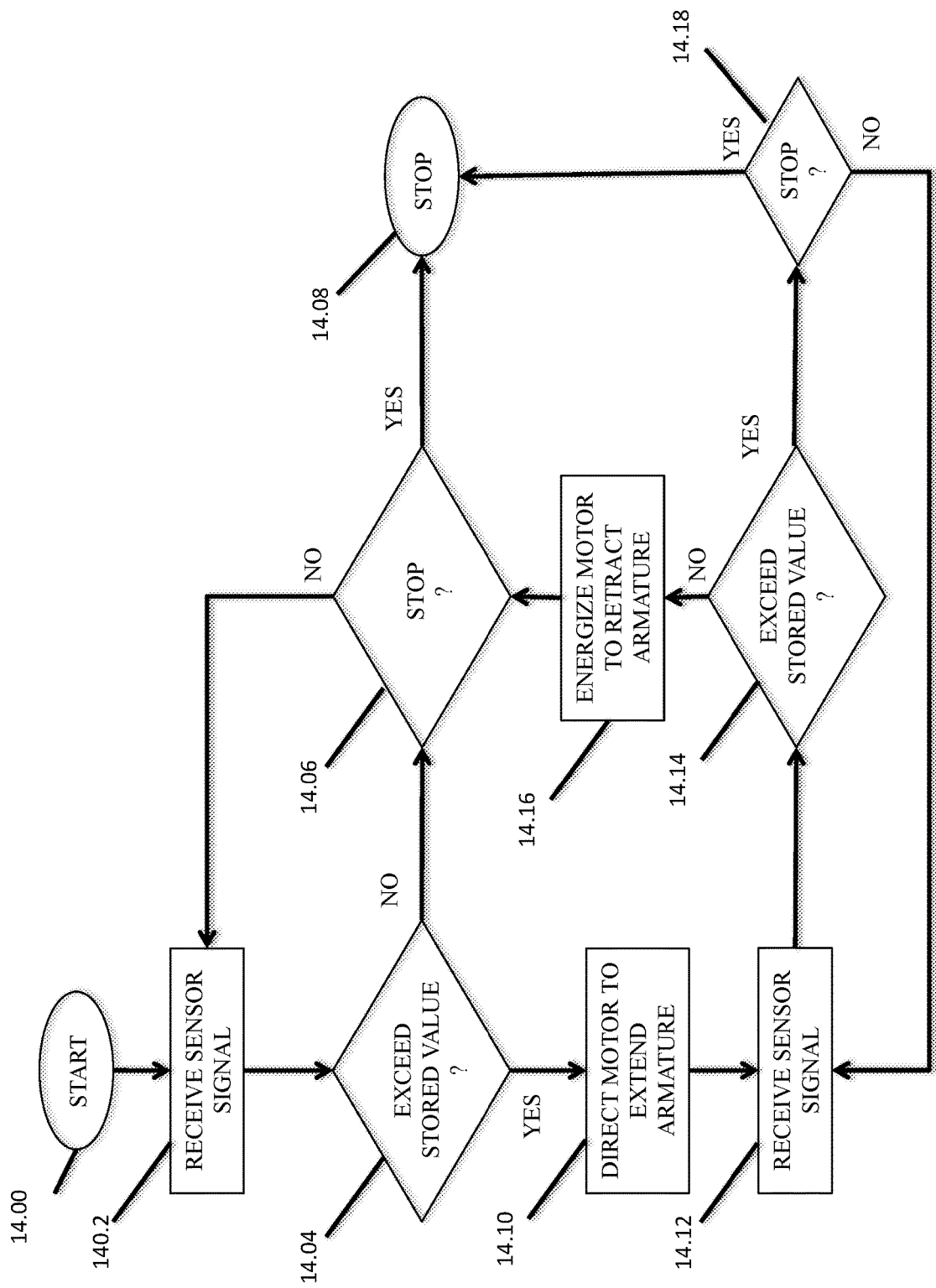
FIG. 14 is a flowchart of the operations of the sensor-informed logic module of FIG. 13.

An electrical battery 1310 provides operational electrical energy to the controller motor 1302, the logic circuit 1304 and the sensor 1306 to enable the performance of the operations as described in the flow chart of FIG. 14. More particularly, the controller motor 1302 is adapted to, and receives sufficient electrical energy from the electrical battery 1310, to drive the armature 1306 toward the lever 8B sufficiently to overcome any all force received by the lever 8B from the spring element 8G and/or one or more springs 800, 802 & 804 and to cause the piston 8E to be repositioned within the piston channel 606 and into the second state of FIG. 1 and FIG. 3.

Referring now generally to the Figures and particularly to FIG. 14, FIG. 14 is a flowchart of the operations of the sensor-informed logic module 1300 (hereinafter, "logic module" 1300). In step 14.00 the logic module 1300 is powered up and the battery 1310 provides electrical energy to (a.) the logic circuit 1304, and (b.) to the controller motor 1302 and the sensor 1308 automatically or optionally as directed by the logic module 1304. The control module 1300 proceeds from step 14.00 to step 14.02 wherein the logic circuit 1304 waits to receive a a signal indicating a failure to detect an environmental quality, a quality detection indication, and/or a measurement signal from the sensor 1308, wherein the logic circuit 1304 determines in step 14.04 whether a detection signal of a measurement value received in step 14.02 (a.) meets the stored quality detection criteria, or meets or exceeds the parametric stored value; or alternatively (b.) fails to meet the stored quality detection criteria, or fails to meet or exceed the stored parametric stored value.

When the logic circuit 1304 determines in step 14.04 that neither (a.) an indication of a detection or non-detection of a preselected environmental quality as prescribed by information stored in the logic circuit 1304, nor (b.) a measurement value of the environmental quality exceeding a parametric value stored in the logic circuit 1304 has been received from the sensor 1308 in step 14.02, the logic module 1300 proceeds on to step 14.06.

In step 14.06 the logic module 1300 determines whether to proceed on to step 14.08 and cease operations, or alternatively to proceed on to an additional execution of step 14.02.

In another alternative, when the logic circuit 1304 determines in step 14.04 that either (a.) an indication of a detection of a preselected environmental quality stored in the logic circuit 1304, or (b.) a measurement value of the environmental quality that exceeds a stored value stored in the logic circuit 1304 has been received in step 1402, the logic module 1300 proceeds on from step 14.04 to step 14.10. In step 14.10 the logic circuit 1304 directs the controller motor 1308 to drive the armature 1306 toward the lever 8B and in a direction away from the input channel 16, wherein the battery 1310 supplies the electrical energy to the controller motor 1308 to enable the controller motor 1308 to drive the armature 1306 with sufficient force to fully overcome any resistance force received by the lever 8B from any and all of the spring element 8G and springs 800, 802 & 804.

The control module 1300 proceeds from step 14.10 to step 14.12 wherein the logic circuit 1304 waits to again receive a quality detection or a measurement signal from the sensor 1308, wherein the logic circuit 1304 determines in step 14.14 whether a detection signal of a measurement value received in step 14.02 (a.) meets the stored quality detection criteria, or meets or exceeds the parametric stored value; or alternatively (b.) fails to meet the stored quality detection criteria, or fails to meet or exceed the stored parametric value.

When the control logic 1304 determines in step 14.14 that an additional detection signal or a measurement value received in step 14.12 fails to meet the stored quality detection criteria, or fails meet or exceed the stored parametric value, the control module 1300 proceeds on to step 14.16 and directs the controller motor 1302 to retract the armature 1306 away from the lever 8B. The control module 1300 proceeds from step 14.16 to step 14.06, and determines in step 14.06 whether to proceed on to step 14.08 and cease operations, or alternatively to proceed on to an additional execution of step 14.02.

In the alternative, when the control logic 1304 determines in step 14.14 that an additional detection signal or a measurement value received in step 14.12 meets the stored detection criteria, or meets or exceeds the stored parametric value, the control module 1300 directs the controller motor to continue to drive the armature 1306 against the lever 8B with sufficient force to fully overcome any resistance force received by the lever 8B from any and all of the spring element 8G and springs 800, 802 & 804. The control module 1300 proceeds from step 14.14 to step to step 14.18, and determines in step 14.18 whether to proceed on to step 14.08 and cease operations, or alternatively to proceed on to an additional execution of step 14.12.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based herein. Accordingly, the disclosure of the embodiments of the invention is intended to be illustrative, but not limiting, of the scope of the invention, which is set forth in the following claims.

I claim:

1. A fluid diversion device comprising:
a body forming an internal channel having an input channel, an output channel and a diversion channel, the output channel and the diversion channel extending from the input channel;
a temperature-activated actuator extending from the input channel and at least partially within an actuator tunnel, the actuator tunnel extending from the input channel and to an exterior of the body;
a lever having an actuator end, a fulcrum point and a piston end, the fulcrum point disposed between the actuator end and the piston end, wherein the lever is rotatably coupled with the actuator at the actuator end and the lever is rotatably coupled with the body at the fulcrum end;
a spring element coupled with the lever and providing a force vector that drives the lever actuator end toward the inner channel;
a piston extending from the input channel and at least partially within a piston tunnel, the piston tunnel extending from the input channel and to the exterior of the body, and the piston having an upper end and a lower end, the upper end defining a piston canal and lower end rotatably coupled with the lever piston end; and
an override assembly movably coupled with the body and positioned and shaped for selective engagement with the piston lower end to override the spring element and to position the piston canal to enable a fluid to flow from the input channel and fully through the output channel.

2. The device of claim 1, wherein the spring element is coupled with the lever between the fulcrum point and the piston end and applies a compressive force to the lever, wherein the compressive force presents a vector oriented to rotate the lever actuator end toward the inner channel.

3. The device of claim 1, wherein the spring element is coupled with the lever between the fulcrum point and the actuator end and applies a tensile force to the lever, wherein the tensile force presents a vector oriented to rotate the lever actuator end toward the inner channel.

4. The device of claim 1, wherein the spring element is coupled with the fulcrum point and applies a compressive force to the lever between the fulcrum point and the piston end lever, wherein the compressive force presents a vector oriented to rotate the lever actuator end toward the inner channel.

5. The device of claim 1, wherein the spring element is coupled with the lever at the fulcrum point and provides a tensile force to the lever between the fulcrum point and the lever actuator end, wherein the tensile force presents a vector oriented to rotate the lever actuator end toward the inner channel.

6. The device of claim 1, wherein the actuator extends in length as heat is applied to the actuator and thereby drives the lever actuator end away from the body.

7. The device of claim 1, wherein the override assembly is rotatably coupled with the body.

8. The device of claim 7, wherein the override assembly comprises a handle that enables manual positioning of the override assembly into and out of engagement with the piston, whereby the piston is selectively positioned to enable and alternately disable fluid flow into the output channel.

9. The device of claim 1, wherein the override assembly comprises an elongate element.

10. The device of claim 9, wherein the override elongate element comprises a notch and the notch is shaped and positioned for selective fixation within the piston tunnel, whereby the elongate element is selectively stabilized to position the piston to enable fluid flow through the piston canal and from the inner channel and into the output channel.

11. The device of claim 9, wherein the piston tunnel comprises a narrowing feature distal from the inner channel and forming an internal circumference and the elongate element comprises a wide portion, the wide portion posited between the piston and the narrowing feature and the wide portion sized larger than the narrowing feature internal circumference, whereby the elongate element wide portion is captured within the piston tunnel and between the piston and the piston tunnel narrowing feature.

12. The device of claim 1, wherein the piston is shaped and positioned to block fluid flow into the output channel when the lever piston end is distal from the body.

13. The device of claim 1, wherein the piston is shaped and positioned to enable fluid flow through the piston canal and into the output channel when the lever piston end is proximate to the body.

14. The device of claim 1, wherein the piston is shaped and positioned to not fully block fluid flow from the input channel and into the diversion channel when the lever piston end is distal from the body.

15. The device of claim 1, wherein the piston is shaped and positioned to inhibit flow from the input channel and into the diversion channel when the lever piston end is proximate from the body.

16. The device of claim 1, wherein the spring element comprises an elastomer strip.

17. The device of claim 1, wherein the spring element comprises a torque torsion spring.

18. The device of claim 1, wherein the fluid comprises water.

19. A fluid diversion device comprising:
a body forming an internal channel having an input channel, an output channel and a diversion channel, the output channel and the diversion channel extending from the input channel;
an environmentally-activated actuator extending from the input channel and at least partially within an actuator tunnel, the actuator tunnel extending from the input channel and to an exterior of the body;
a lever having an actuator end, a fulcrum point and a piston end, the fulcrum point disposed between the actuator end and the piston end, wherein the lever is rotatably coupled with the actuator at the actuator end and the lever is rotatably coupled with the body at the fulcrum end;
a spring element coupled with the lever and providing a force vector that drives the lever actuator end toward the inner channel;
a piston extending from the input channel and at least partially within a piston tunnel, the piston tunnel extending from the input channel and to the exterior of the body, and the piston having an upper end and a lower end, the upper end defining a piston canal and lower end rotatably coupled with the lever piston end; and
an override assembly, the override assembly movably coupled with the body and positioned and shaped for selective engagement with the piston lower end to override the spring element and to position the piston canal to enable a fluid to flow from the input channel and fully through the output channel.

20. The device of claim 19, wherein the actuator extends in length as an environmental quality alters in intensity within the input channel and the actuator thereby drives the lever actuator end away from the body.

* * * * *